United States Patent
Faerber et al.

(10) Patent No.: US 9,155,049 B2
(45) Date of Patent: Oct. 6, 2015

(54) METHOD AND APPARATUS FOR POWER REDUCTION CONTROL IN HOME NETWORK ENVIRONMENT

(75) Inventors: Michael Faerber, Wolfratshausen (DE); Ottmar Aumann, Munich (DE)

(73) Assignee: Nokia Solutions and Networks Oy, Espoo (FI)

( * ) Notice: Subject to any disclaimer, the term of this patent is extended or adjusted under 35 U.S.C. 154(b) by 772 days.

(21) Appl. No.: 13/390,986

(22) PCT Filed: Aug. 17, 2009

(86) PCT No.: PCT/EP2009/060622
§ 371 (c)(1), (2), (4) Date: Feb. 17, 2012

(87) PCT Pub. No.: WO2011/020489
PCT Pub. Date: Feb. 24, 2011

(65) Prior Publication Data
US 2012/0149363 A1     Jun. 14, 2012

(51) Int. Cl.
*H04W 24/00*     (2009.01)
*H04W 52/04*     (2009.01)
*H04W 52/08*     (2009.01)
(Continued)

(52) U.S. Cl.
CPC .............. *H04W 52/04* (2013.01); *H04W 52/08* (2013.01); *H04W 52/143* (2013.01); *H04W 52/243* (2013.01); *H04B 17/345* (2015.01); *H04W 16/08* (2013.01); *H04W 52/362* (2013.01); *H04W 84/045* (2013.01); *Y02B 60/50* (2013.01)

(58) Field of Classification Search
CPC .................................................... H04W 24/00
USPC .......................................... 455/423, 522, 296
See application file for complete search history.

(56) References Cited

U.S. PATENT DOCUMENTS

2008/0069028 A1 * 3/2008 Richardson ................... 370/328
2009/0186609 A1   7/2009 Wu et al. ........................ 455/424
(Continued)

FOREIGN PATENT DOCUMENTS

EP       1 936 829 A1    6/2008
WO    WO 01/03329 A1    1/2001
(Continued)

OTHER PUBLICATIONS

R4-092063, "Analysis of HNB Coverage and HNB Interference to Macro UE for Enhanced Interference Management", 3GPP TSG-RAN WG4 Meeting #51, San Francisco, CA, USA, May 4-8, 2009, Qualcomm Europe, NTT-DOCOMO, Vodafone Group, 9 pgs.
(Continued)

*Primary Examiner* — Muthuswamy Manoharan
(74) *Attorney, Agent, or Firm* — Harrington & Smith

(57) ABSTRACT

There are provided measures for power reduction control in a home network environment, which may be applicable in an interworking of a home network area and a macro network area. Such measures for power reduction control may for example include, upon receipt of an initial power reduction command from a network element of a macro network area, reducing a transmit power in a home network area by a predetermined power reduction amount and starting a timer with a predetermined time period, and upon receipt of a further power reduction command from a network element of a macro network area as long as the timer is not expired, discarding the further power reduction command.

14 Claims, 10 Drawing Sheets

(51) Int. Cl.
*H04W 52/14* (2009.01)
*H04W 52/24* (2009.01)
*H04M 1/00* (2006.01)
*H04B 1/10* (2006.01)
*H04W 16/08* (2009.01)
*H04W 52/36* (2009.01)
*H04W 84/04* (2009.01)
*H04B 17/345* (2015.01)

(56) References Cited

U.S. PATENT DOCUMENTS

2009/0227263 A1* 9/2009 Agrawal et al. ............ 455/452.1

2012/0281588 A1* 11/2012 Damnjanovic ................ 370/252

FOREIGN PATENT DOCUMENTS

| WO | WO 2009/023604 A2 | 2/2009 |
| WO | WO 2009/035983 A1 | 3/2009 |
| WO | WO 2009/065075 A1 | 5/2009 |

OTHER PUBLICATIONS

NGMN Recommendation on SON & O&M Requirements, A Requirement Specification by NGMN Alliance, Dec. 5, 2008, Version 1.23, 39 pgs.

* cited by examiner

METHOD AND APPARATUS FOR POWER REDUCTION CONTROL IN HOME NETWORK ENVIRONMENT

TECHNICAL FIELD

The present invention generally relates to a power reduction control in a home network environment. For example, the present invention may be applicable to a power reduction control in an interworking of a home network area and a macro network area sharing a common part of a radio spectrum.

BACKGROUND

For modern and future communication networks including mobile/wireless communication networks (such as for example General Packet Radio Service (GPRS), Universal Mobile Telecommunication System (UMTS), Long-Term Evolution (LTE), Long-Term Evolution Advance (LTE-A), or other 3GPP (3GPP: Third Generation Partnership Project) networks, or the like), there is known a concept of a simultaneous presence of home and macro network access.

Accordingly, the following specification relates to mobile wireless communications, such as 3GPP UMTS, Long-Term Evolution (LTE & LTE-A) or the like, and is related more specifically to an interworking of a home nodeB or the like and networks comprised of macro nodeBs or the like.

For the subsequent specification and the terminology used therein, the following is to be noted. The term "HNB" is a terminology commonly used for WCDMA/HSPA (WCDMA: Wideband Code Division Multiple Access, HSPA: High Speed Packet Access) home equipment. For LTE and LTE-A the term commonly used for home equipment is "HeNB", where the e stands for evolved. The macro nodeB for UMTS is commonly called "nodeB" ("NB"), whereas for LTE and LTE-A the macro nodeB is commonly called "eNB", where the e stands for evolved. The subsequent text uses the terms home nodeB or "HNB" and macro nodeB or "MNB" as non-limiting examples only, without limiting the thus described techniques and concepts to any one of UMTS, WCDMA and/or HSPA. Rather, the thus described techniques and concepts may equally be applied in other systems as well, such as for example LTE and LTE-A.

Furthermore, it is to be noted that any home equipment may comprise several techniques to serve different end user equipment within a CSG (closed subscriber group), thus a home cell or femtocell may be formed of a combination of a HNB and a HeNB.

FIG. 1 shows, in two alternative illustrations, a schematic diagram of an architecture of a simultaneous presence of a home cell and a macro cell, in which exemplary embodiments of the present invention are applicable.

As depicted in FIG. 1A, a mobile station or user equipment UE may be connectable both to a home access network denoted as home cell and/or a macro access network denoted as macro cell. Typically, while access to the home cell is restricted for a closed subscriber group (CSG) being authorized for the respective home cell, access to the macro cell is commonly available. Stated in other words, the home cell may be a private access facility, while the macro cell may be a public access facility such as a 3G radio access network (RAN). In 3GPP, a home cell is also referred to as femtocell.

As depicted in FIG. 1B, a mobile station or user equipment UE may be connectable to a backbone or core network via a home cell or access network (AN) or via a macro cell or radio access network (AN). An exemplary home cell according to FIG. 1B comprises a home base station or home nodeB (HNB), to which the UE is connectable, for example by a wireless link, and a respective home base station or home nodeB gateway (HNB). The HNB aggregates traffic from a large number of HNBs, although this is not depicted in FIG. 1B for the sake of clarity. An exemplary macro cell according to FIG. 1B comprises one or more macro base stations or macro nodeBs (MNB), to which the UE is connectable, for example by a wireless link, and a radio network controller (RNC) or the like.

Home cells, i.e. home nodeBs, are intended to enhance the coverage of a public radio access network such as a UMTS RAN in a home environment, such as for example a home or apartment, i.e. a private location. Accordingly, home cells, i.e. home nodeBs, provide radio coverage for mobile stations or user equipments within a home environment in addition to radio coverage provided by macro cells, i.e. macro nodeBs. Traffic of/in home cells may thus bypass the mobile infrastructure of mobile network providers such as a UMTS RAN. A deployment of home cells or home nodeBs in parallel to a deployment of macro cells or macro nodeBs is not controllable. Therefore, with increase in the number of deployed home cells or home nodeBs within an overall macro network deployment, there arise problems of interference there-between.

Namely, the simultaneous presence of a home nodeB (HNB) and a macro nodeB (MNB), sharing the same part of the radio spectrum, may cause severe interference scenarios. A user equipment UE being allocated to a macro cell, which receives macro cell signals with a power close to a service-specific power set threshold, may be desensitized by the HNB transmit power. This is because of the problem that that the HNB power received is too large so as to properly receive and decode a MNB signal.

As mentioned above, a HNB is only accessible for the set of users assigned to the closed user group (CSG) of the HNB. Thus, no handover from the MNB to the HNB is possible for the user equipment for getting out of the above-outlined interference scenario. Otherwise, macro cell activities to improve the wireless link to the user equipment will cause capacity losses in the macro cell and will increase interference to the home cell.

In view of the above problem, there is a need for enhanced interference management techniques in a home network environment so as to mitigate interference between home and macro cells.

In this regard, there has been proposed a technique considering that the user equipment may report the HNB interference situation and the macro cell may utilize the backbone/core network to reduce the transmit power of the HNB so as to reduce the interference from the home cell to the macro cell.

The thus proposed technique is explained with reference to FIG. 2. FIG. 2 shows, in two alternative illustrations, a schematic diagram of an operational principle of a known interference mitigation technique in a home environment.

As depicted in FIG. 2A, a user equipment UE, which is authorized for the macro cell, but is not authorized for the home cell (i.e. does not belong to the CSG of the home cell), may be camping in the macro cell in vicinity of the home cell's coverage area. Hence, the UE camping on the macro cell may identify an interference being caused in the macro cell by the transmit power of the home cell, i.e. the HNB of the home cell, and may report the presence of this interference to the macro cell, i.e. the MNB of the macro cell. The macro cell, i.e. the responsible MNB, may address, via the HNB gateway, the HNB causing the interference for sending power down commands (power reduction commands) until the user equipment UE camping on the macro cell stops the interference reporting, namely until the interference is removed due to sufficient transmit power reductions at the HNB. The power down commands are proposed to be relative values, e.g. 2 dB step down.

While the above-outlined technique is practicable in a scenario of one macro cell related to one HNB and one UE affected by interference, it is not practicable is more difficult scenarios, for example when several UEs and/or macro cells (and one home cell) are involved.

Such a more difficult scenario is depicted in FIG. 2B. As depicted in FIG. 2B, there is exemplarily assumed a scenario with three UEs, all of them being not authorized to camp on the home cell, and these UEs are allocated to three different macro cells. All of these UEs have a high interference impact by a single HNB. All MNBs will receive interference reports from the respective UE in its macro cell, and consequently they will initiate, via the HNB gateway, the sending of power down commands (power reduction commands) to the same HNB of the relevant home cell. This may lead to an execution of more power down operation at the HNB than necessary, and may lead to an extinction of the home cell, i.e. a shrinkage of the home cell's coverage (close) to zero, practically providing no coverage to the CSG users any more.

There is no possibility of avoiding such a problematic outcome. In particular, it is neither applicable nor practicable to provide countermeasures at the HNB gateway. This is because such a HNB gateway is typically controlling many thousands of HNBs, and it would lead to huge management functions to control at the HNB GW how far more than one macro cell may try to address the same HNB at the same time.

Accordingly, in view of the above, there is a need for enhanced interference management techniques in a home network environment so as to mitigate interference between home and macro cells, which may avoid excessive degradation or even extinction of a home cell causing interference in a macro cell.

SUMMARY OF EXEMPLARY EMBODIMENTS OF THE INVENTION

Embodiments of the present invention are made to provide for a feasible solution for a power reduction control in a home network environment. In particular, but not exclusively, embodiments of the present invention are made to overcome or at least mitigate above-outlined problems and drawbacks.

According to an exemplary first aspect of the present invention, there is provided a method comprising, upon receipt of an initial power reduction command from a network element of a macro network area, reducing a transmit power in a home network area by a predetermined power reduction amount and starting a timer with a predetermined time period, and, upon receipt of a further power reduction command from a network element of a macro network area as long as the timer is not expired, discarding the further power reduction command.

According to further developments or modifications thereof, one or more of the following applies in any conceivable combination:
the method further comprises, upon receipt of a further power reduction command from a network element of a macro access area after the timer is expired, reducing a transmit power in the home network area by the predetermined power reduction amount and restarting the timer with the predetermined time period,
the initial and further power reduction commands each include a unique identifier,
upon receipt of an initial power reduction command with a first unique identifier, the transmit power in the home network area is reduced by the predetermined power reduction amount and a timer with a predetermined time period is started, said timer being associated with said first unique identifier,
upon receipt of a further power reduction command with said first unique identifier as long as the timer is not expired, the transmit power in the home network area is reduced by the predetermined power reduction amount and the timer associated with said first unique identifier with the predetermined time period is restarted,
upon receipt of a further power reduction command with a unique identifier other than said first unique identifier as long as the predetermined time period is not expired, the further power reduction command is discarded,
the method further comprises, upon non-receipt of a further power reduction command within the predetermined time period, disabling the timer associated with said first unique identifier,
upon receipt of a further power reduction command with a unique identifier other than said first unique identifier after the timer associated with said first unique identifier is expired, the transmit power in the home network area is reduced by the predetermined power reduction amount and a timer with the predetermined time period is started, said timer being associated with said other unique identifier,
the initial and further power reduction commands each include a severity level indicating a degree of interference in the macro network area caused by the transmit power in the home network area,
the reducing the transmit power further comprises determining a power reduction amount on the basis of the severity level in a power reduction command, and setting the determined power reduction amount as the predetermined power reduction amount,
the initial power reduction command is a power reduction command received first after an initialization or a power reduction command received when no timer is started,
the predetermined time period is set to be equal to or longer than the time needed for a transmit power reduction operation,
the predetermined time period is adjustable by at least one of an operation and maintenance command and an autonomous self-optimizing network function,
the unique identifier uniquely identifies at least one of a user equipment of said macro network area and a combination of a user equipment and a base station or nodeB of said macro network area,
the unique identifier comprises a unique identification of a user equipment of said macro network area and/or a unique identification of a base station or nodeB of said macro network area,
the method is operable at least one of a home base station and a home nodeB of said home network area,
the network element of the macro network area is at least one of a macro base station and a macro nodeB of said macro network area,
the home network area comprises a femtocell of a wireless communication network, and/or
the macro network area comprises a radio access network of a wireless communication network.

According to an exemplary second aspect of the present invention, there is provided an apparatus comprising a receiver configured to receive power reduction commands from a network element of a macro network area, a power reduction command processor configured to process received power reduction commands, said power reduction command processor comprising a timer unit and a power reduction unit, wherein the power reduction command processor is configured to cause, upon receipt of an initial power reduction command, said power reduction unit to reduce a transmit power in a home network area by a predetermined power reduction amount and said timer unit to start a timer with a predetermined time period, and the power reduction command processor is configured to, upon receipt of a further power reduction command as long as the timer is not expired, discard the further power reduction command.

According to further developments or modifications thereof, one or more of the following applies in any conceivable combination:

the power reduction command processor is configured to, upon receipt of a further power reduction command after the timer is expired, cause said power reduction unit to reduce a transmit power in the home network area by the predetermined power reduction amount and cause said timer unit to restart the timer with the predetermined time period, the initial and further power reduction commands each include a unique identifier, the power reduction command processor is configured to cause, upon receipt of an initial power reduction command with a first unique identifier, said power reduction unit to reduce the transmit power in the home network area by the predetermined power reduction amount and said timer unit to start a timer with a predetermined time period, said timer being associated with said first unique identifier, the power reduction command processor is configured to cause, upon receipt of a further power reduction command with said first unique identifier as long as the timer is not expired, said power reduction unit to reduce the transmit power in the home network area by the predetermined power reduction amount and said time unit to restart the timer associated with said first unique identifier with the predetermined time period, the power reduction command processor is configured to, upon receipt of a further power reduction command with a unique identifier other than said first unique identifier as long as the predetermined time period is not expired, discard the further power reduction command, the power reduction command processor is configured to, upon non-receipt of a further power reduction command within the predetermined time period, disable the timer associated with said first unique identifier, the power reduction command processor is configured to cause, upon receipt of a further power reduction command with a unique identifier other than said first unique identifier after the timer associated with said first unique identifier is expired, said power reduction unit to reduce the transmit power in the home network area by the predetermined power reduction amount and said timer unit to start a timer with the predetermined time period, said timer being associated with said other unique identifier, the initial and further power reduction commands each include a severity level indicating a degree of interference in the macro network area caused by the transmit power in the home network area, the power reduction unit is configured to determine a power reduction amount on the basis of the severity level in a power reduction command, and set the determined power reduction amount as the predetermined power reduction amount, the initial power reduction command is a power reduction command received first after an initialization or a power reduction command received when no timer is started, the predetermined time period is set to be equal to or longer than the time needed for a transmit power reduction operation, the predetermined time period is adjustable by at least one of an operation and maintenance command and an autonomous self-optimizing network function, the unique identifier uniquely identifies at least one of a user equipment of said macro network area and a combination of a user equipment and a base station or nodeB of said macro network area, the unique identifier comprises a unique identification of a user equipment of said macro network area and/or a unique identification of a base station or nodeB of said macro network area, the apparatus comprises at least one of a home base station and a home nodeB of said home network area, the network element of the macro network area is at least one of a macro base station and a macro nodeB of said macro network area, the home network area comprises a femtocell of a wireless communication network, and/or the macro network area comprises a radio access network of a wireless communication network.

According to an exemplary third aspect of the present invention, there is provided a computer program product comprising program code means being arranged, when run on a processor of an apparatus (for example, the apparatus according to the second aspect or any further development and/or modification thereof), to perform the method according to the first aspect or any further development and/or modification thereof.

According to an exemplary fourth aspect of the present invention, there is provided a method comprising receiving an interference report including an indication of a presence of interference and a severity level indicating a degree of the interference in a macro network area caused by a transmit power in a home network area from a user equipment of said macro network area, creating a unique identifier for the received interference report, generating a power reduction command concerning the received interference report including the created unique identifier, and sending the generated power reduction command to a network element of the home network area.

According to further developments or modifications thereof, one or more of the following applies in any conceivable combination:

the method further comprises, when more than one power reduction command is available, sending the power reduction commands in a predetermined time structure, the unique identifier uniquely identifies at least one of a user equipment of said macro network area and a combination of a user equipment and a base station or nodeB of said macro network area, said creating comprises composing the unique identifier of a unique identification of a user equipment of said macro network area and/or a unique identification of a base station or nodeB of said macro network area, the method further comprises monitoring frequency and severity levels of received interference reports, detecting a capacity level in the macro network area, deciding on a possibility of overload in the macro network area on the basis of the monitored frequency and severity levels and the detected capacity level, and discarding generated power reduction commands, if it is decided that there is a possibility of overload in the macro network area, the method is operable at least one of a macro base station and a macro nodeB of said macro network area, the network element of the home network area is at least one of a home base station and a home nodeB of said macro network area, the home network area comprises a femtocell of a wireless communication network, and/or the macro network area comprises a radio access network of a wireless communication network.

According to an exemplary fifth aspect of the present invention, there is provided an apparatus comprising a receiver configured to receive an interference report including an indication of a presence of interference and a severity level indicating a degree of the interference in a macro network area caused by a transmit power in a home network area from a user equipment of said macro network area, an identifier creator configured to create a unique identifier for the received interference report, a power reduction command generator configured to generate a power reduction command concerning the received interference report including the created unique identifier, and a transmitter configured to send the generated power reduction command to a network element of the home network area.

According to further developments or modifications thereof, one or more of the following applies in any conceivable combination:

when more than one power reduction command is available, said transmitter is configured to send the power reduction commands in a predetermined time structure, the unique identifier uniquely identifies at least one of a user equipment of said macro network area and a combination of a user equipment and a base station or nodeB of said macro network area, said identifier creator is configured to compose the unique identifier of a unique identification of a user equipment of said macro network area and/or a unique identification of a base station or nodeB of said macro network area, the apparatus further comprises an interference monitor configured to monitor frequency and severity levels of received interference reports, a capacity detector configured to detect a capacity level in the macro network area, and an overload processor configured to decide on a possibility of overload in the macro network area on the basis of the monitored frequency and severity levels and the detected capacity level, and to discard generated power reduction commands, if it is decided that there is a possibility of overload in the macro network area, the apparatus comprises at least one of a macro base station and a macro nodeB of said macro network area, the network element of the home network area is at least one of a home base station and a home nodeB of said macro network area, the home network area comprises a femtocell of a wireless communication network, and/or the macro network area comprises a radio access network of a wireless communication network.

According to an exemplary sixth aspect of the present invention, there is provided a computer program product comprising program code means being arranged, when run on a processor of an apparatus (for example, the apparatus according to the fifth aspect or any further development and/or modification thereof), to perform the method according to the fourth aspect or any further development and/or modification thereof.

According to an exemplary seventh aspect of the present invention, there is provided a method comprising detecting a presence of interference in a macro network area caused by the transmit power in a home network area, measuring a severity level indicating a degree of the interference in the macro network area, generating an interference report including an indication of a presence of the interference and the severity level, and sending the generated interference report to a network element of the macro network area.

According to further developments or modifications thereof, one or more of the following applies in any conceivable combination:

the method further comprises adding a unique identification to the interference report, the method is operable at least one of a mobile station and a user equipment of said macro network area, the network element of the macro network area comprises at least one of a macro base station and a macro nodeB of said macro network area, the home network area comprises a femtocell of a wireless communication network, and/or the macro network area comprises a radio access network of a wireless communication network.

According to an exemplary eighth aspect of the present invention, there is provided an apparatus comprising an interference detector configured to detect a presence of interference in a macro network area caused by the transmit power in a home network area, a severity level meter configured to measure a severity level indicating a degree of the interference in the macro network area, an interference report generator configured to generate an interference report including an indication of a presence of the interference and the severity level, and a transmitter configured to send the generated interference report to a network element of the macro network area.

According to further developments or modifications thereof, one or more of the following applies in any conceivable combination:

said interference report generator is configured to add a unique identification to the interference report, the apparatus is at least one of a mobile station and a user equipment of said macro network area, the network element of the macro network area comprises at least one of a macro base station and a macro nodeB of said macro network area, the home network area comprises a femtocell of a wireless communication network, and/or the macro network area comprises a radio access network of a wireless communication network.

According to an exemplary ninth aspect of the present invention, there is provided a computer program product comprising program code means being arranged, when run on a processor of an apparatus (for example, the apparatus according to the eighth aspect or any further development and/or modification thereof), to perform the method according to the seventh aspect or any further development and/or modification thereof.

By way of exemplary embodiments of the present invention, there is provided a power reduction control in a home network environment, which may for example in an interworking of a home network area and a macro network area.

By way of exemplary embodiments of the present invention, there is provided an interference mitigation technique capable of resolving multiple power reduction commands emerging from multiple sources, e.g. multiple user equipments related to multiple macro nodeBs or macro cells. That is, the thus provided interference mitigation technique is capable of removing interference from a macro cell without overly affecting the load and/or coverage areas of the macro cell and/or an involved home cell.

BRIEF DESCRIPTION OF THE DRAWINGS

In the following, the present invention will be described in greater detail by way of non-limiting examples with reference to the accompanying drawings, in which.

DETAILED DESCRIPTION OF EXEMPLARY EMBODIMENTS OF THE INVENTION

The present invention is described herein with reference to particular non-limiting examples. A skilled person will appreciate that the invention is not limited to these examples, and may be more broadly applied.

In particular, the present invention and its embodiments are mainly described in relation to 3GPP specifications being used as non-limiting examples for certain exemplary network configurations. In particular, an interworking of home cells (femtocells) and macro cells is used as a non-limiting example of a system with which interference mitigation is to be performed, and nodeB's are used as non-limiting examples of (base) stations providing a user equipment or mobile station with network access. As such, the description of exemplary embodiments given herein specifically refers to terminology which is directly related thereto. Such terminology is only used in the context of the presented non-limiting examples, and does naturally not limit the invention in any way. Rather, any other system configuration, etc. may also be utilized as long as compliant with the features described herein. In particular, embodiments of the present invention may be applicable in any system with two simultaneously present access networks, especially when access to one of the two access networks is restricted by way of a close subscriber group or the like, thus hampering a handover between the two access networks. In particular, home cells are only non-limiting examples for any somehow privileged access networks existing in parallel to one or more public access networks or the like.

In the following, various embodiments and implementations of the present invention and its aspects or embodiments are described using several alternatives. It is generally to be noted that, according to certain needs and constraints, all of the described alternatives may be provided alone or in any conceivable combination (also including combinations of individual features of the various alternatives).

In the following, exemplary embodiments of the present invention are described with reference to methods, procedures and functions.

Figure 1A:
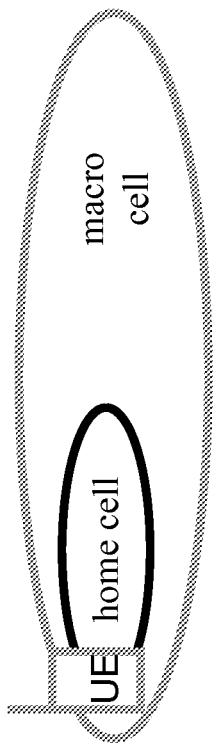
FIG. 1 shows, in two alternative illustrations, a schematic diagram of an architecture of a simultaneous presence of a home cell and a macro cell, in which exemplary embodiments of the present invention are applicable.
Figure 1B:
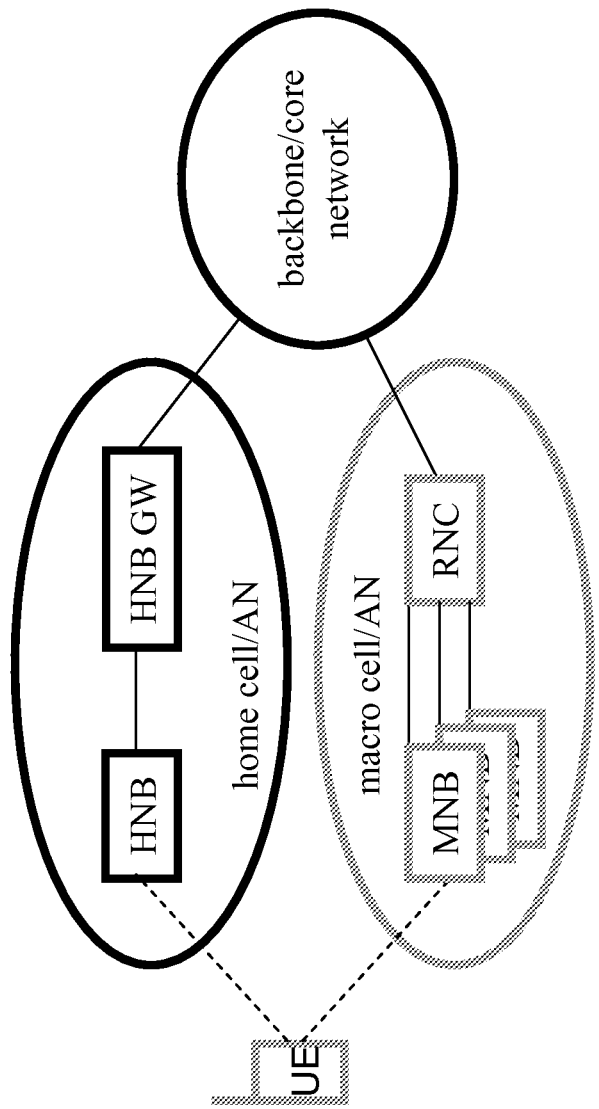
Figure 2:
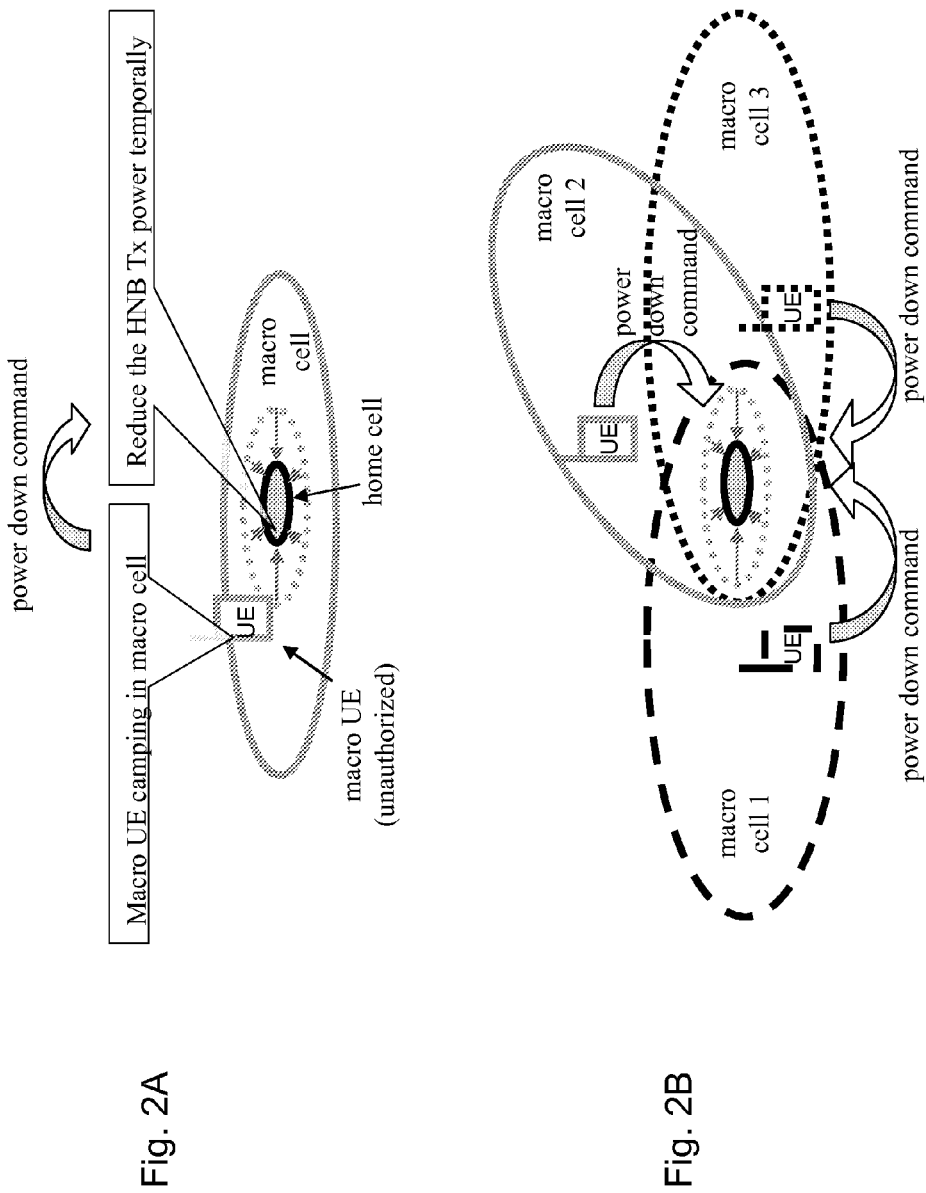
FIG. 2 shows, in two alternative illustrations, a schematic diagram of an operational principle of a known interference mitigation technique in a home environment.
Figure 3:
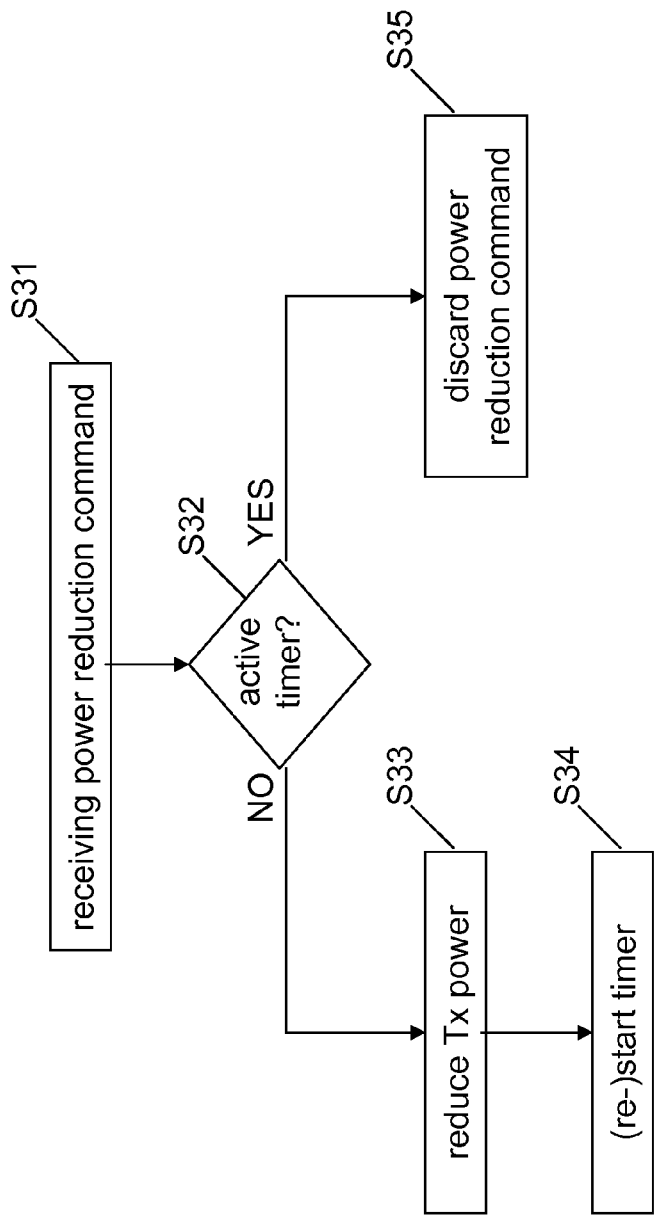
FIG. 3 shows a flowchart of a first example of a method at a home cell according to exemplary embodiments of the present invention.

FIG. 3 shows a flowchart of a first example of a method at a home cell according to exemplary embodiments of the present invention. The thus depicted method may be implemented to be carried out by or at a home base station or home nodeB or home evolved nodeB, commonly denoted as HNB, of a home cell or home access network or home network area.

As depicted in FIG. 3, an exemplary implementation of such a method may comprise the following steps.

In step S31, a power reduction command is received at the HNB, which indicates the need for reducing the transmit power in the home cell of the HNB, from a macro cell network element such as a MNB (for example, via a HNB gateway). Thus, the power reduction command may be delivered via a backbone or core network. Upon receipt of the power reduction command, it is distinguished (checked) whether it is an initial power reduction command, i.e. a first one received after initialization, power-on or the like, or a first one received when no timer is active (see below), or whether it is a further power reduction command, i.e. a non-initial power reduction command. Such distinction is effected on the basis of a timer. Namely, when there is no active timer (NO in step S32), the received command is regarded as an initial power reduction command, while the received command is regarded as a further power reduction command, when there is an active timer (YES in step S32), i.e. a timer which is not expired.

In case of a initial power reduction command being received, the transmit (downlink) power of the HNB is reduced by a predetermined amount, e.g. 2 dB, in step S33, and a timer with a predetermined time period is started in step S34.

In case of a further power reduction command being received, the power reduction command is discarded in step S35. That is, the power reduction command is ignored in that no transmit (downlink) power reduction is performed in response thereto.

That is, as long as the timer being started upon receipt of an initial power reduction command is active, the HNB discards all other power reduction commands received.

The power reduction amount is a pre-configured value. That is, with each received and accepted command, the power is decremented by this specific step size.

The time period, i.e. the duration, of the timer being started in this way is set to be equal to or longer than the time needed for one power reduction operation, i.e. for measuring interference at a user equipment, reporting the presence of interference from the user equipment to a MNB, processing and conveying a respective power reduction command at/from the MNB and executing the respective power reduction command at the HNB. The time period may for example be adjusted by an OAM (operation, administration, maintenance) command and/or by an autonomous SON (self optimizing network) function. By selecting the timer (i.e. a power reduction blocking/discarding window) that way, not only multiple power reduction commands emerging from other macro cells and from multiple user equipments within one macro cell are ignored, but also further power reduction commands from the user equipment sending the initial power reduction command are ignored, which are sent after the initial power reduction command but within a certain time period, in which the HNB had no chance to completely execute the requested power reduction.

Such a blocking/discarding window provides a protection to avoid that a HNB coverage range is extinguished due to multiple power reduction commands being received in short time. Stated in other words, it is a protection to avoid that subsequently received power reduction commands are executed, although they are no longer necessary (but obsolete) due to the power reduction executed on the basis of the previously received power reduction command. That is, such a blocking/discarding window addresses the latency between interference detection at a user equipment, the respective power reduction and a new interference (non-)detection at the or another user equipment after HNB power reduction.

Assuming that a first UE sending a power reduction command via a MNB and the backbone/core network to the HNB is pleased with the thus executed power reduction, it will not send any further commands. A second UE still being interfered, after the first UE's power reduction command is executed, can send a further power reduction command, and will be accepted (as a new initial power reduction command) after expiration of the timer. Each acceptance of a power reduction command will re-start the timer.

In summary, a method according to exemplary embodiments of the present invention comprises the operations of, upon receipt of an initial power reduction command from a network element of a macro network area, reducing a transmit power in a home network area by a predetermined power reduction amount and starting a timer with a predetermined time period, and, upon receipt of a further power reduction command from a network element of a macro network area as long as the timer is not expired, discarding the further power reduction command. Receiving of power reduction commands may be accomplished by a receiver, reducing transmit power may by accomplished by a power reduction unit, starting a timer may be accomplished by a timer unit, and discarding power reduction commands as well as an appropriate control of the power reduction unit and the timer unit may be accomplished by a power reduction command processor.

In brief, an exemplary technique according to embodiments of the present invention is based on the principle that a received power reduction command is discarded, when (as long as) a timer (i.e. a blocking window) is active (i.e. not elapsed) upon receipt thereof, which has been started upon receipt of an initial power reduction command.

Figure 4:
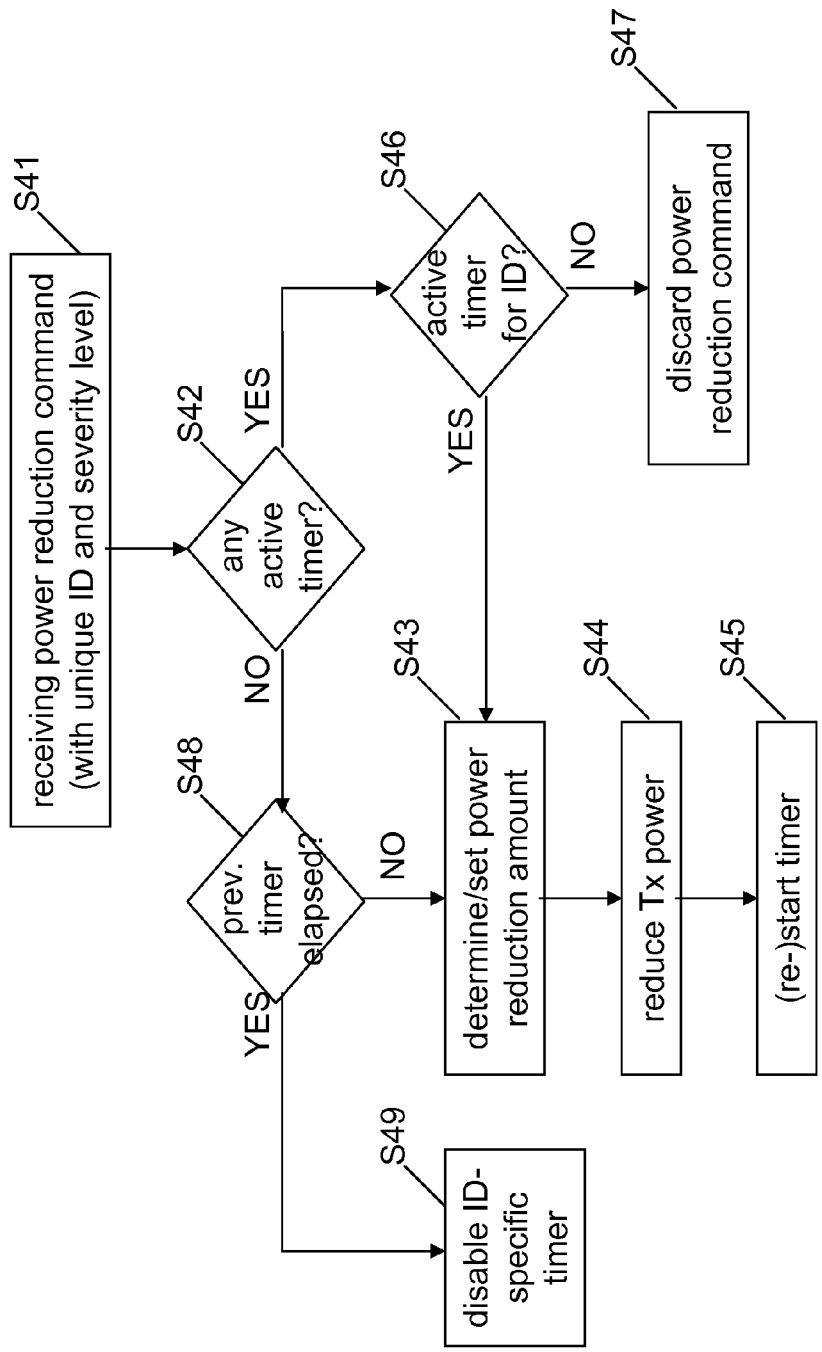
FIG. 4 shows a flowchart of another example of a method at a home cell according to exemplary embodiments of the present invention.

FIG. 4 shows a flowchart of another example of a method at a home cell according to exemplary embodiments of the present invention. The thus depicted method may be implemented to be carried out by or at a home base station or home nodeB or home evolved nodeB, commonly denoted as HNB, of a home cell or home access network or home network area.

The method according to FIG. 4 basically differs from the method according to FIG. 3 in that no general blocking/discarding window is used, which is effective for power reduction commands from any source, but a specific blocking/discarding window is used, which is effective for power reduction command from sources other then the source of the currently effective power reduction command. Accordingly, source-specific windowing may be accomplished, and also a source-specific power reduction in terms of the requested power reduction amount may be accomplished.

As depicted in FIG. 4, an exemplary implementation of such a method may comprise the following steps.

In step S41, a power reduction command is received at the HNB, which indicates not only the need for reducing the transmit power in the home cell of the HNB, but also comprises an unique identifier and a severity level, from a macro cell network element such as a MNB (for example, via a HNB gateway). The unique identifier is the basis for source-specific windowing, and it identifies the originating user equipment or the originating combination of user equipment and macro cell. The severity level is the basis for a variable step size of power reductions, and it indicates a degree of the detected interference, e.g. an estimated quality degradation by the originating user equipment.

Upon receipt of the power reduction command with the unique identifier, it is distinguished (checked) whether it is an initial power reduction command, i.e. a first one received after initialization, power-on or the like, or a first one received when no timer is active (see below), or whether it is a further power reduction command, i.e. a non-initial power reduction command. Such distinction is effected on the basis of a timer. Namely, when there is no active timer (NO in step S42), the received command is regarded as an initial power reduction command, while the received command is regarded as a further power reduction command, when there is an active timer (YES in step S42), i.e. a timer which is not expired. If it is a further power reduction command (YES in step S42), it is further distinguished whether it is a further power reduction command having the same unique identifier as the currently effective power reduction command, i.e. whether the active timer is associated with the same unique identifier (YES in step S46), or whether it is a further power reduction command having a different unique identifier, i.e. a different source (NO in step S46). If no timer is active (NO in step S42), it is further distinguished whether a there has been a previous timer for the same unique identifier as in the currently received power reduction command. If so (YES in step S48), it is not an initial power reduction command as such (although no timer is currently active), but predetermined time period has elapsed since the previous receipt of a power reduction command with this unique identifier. Accordingly, it is assumed that the previously executed power reduction for this unique identifier was sufficient, and a previously enabled ID-specific windowing for this unique identifier may be disabled, which is performed in step S49.

In case of an initial power reduction command being received, a power reduction amount is determined on the basis of the severity level in the current power reduction command and the thus determined power reduction amount is set as the predetermined power reduction amount for the current power reduction operation (step S43), and the transmit (downlink) power of the HNB is reduced by the thus determined amount specific for the severity level (step S44). Then, an ID-specific timer, i.e. a timer being associated with the unique identifier in the current power reduction command, is started with a predetermined time period (step S45).

In case of a further power reduction command being received, the unique identifier of which is not the one being associated with the currently active timer, the power reduction command is discarded in step S47. That is, the power reduction command is ignored in that no transmit (downlink) power reduction is performed in response thereto. That is, as long as the timer associated with a specific identifier is active, the HNB discards all other power reduction commands having different identifiers.

In case of a further power reduction command being received, the unique identifier of which is the one being associated with the currently active timer, the operations of steps S43, S44 and S45 are performed.

In summary, the above-described example provides for the following features.

On the one hand, power reduction step size may be adjusted. On the other hand, power reduction may be performed in a UE-specific manner. Namely, after having received an initial power reduction command with a unique identifier, the HNB will ignore power reduction commands with other unique identifiers and from the originating macro nodeB, as long the timer for the unique identifier has not expired. The first MNB will stop sending these commands, when the associated UE has stopped to report interference. If the HNB does not receive in the next expectation time window a message, the UE-specific windowing will be disabled. The HNB will then consider the next power reduction command from any other macro UE which is received first without any expectation window being active. After reception of a new power reduction command, the HNB will only consider this command and further commands related to this unique identifier, and will set up a new UE-specific windowing with a new expectation window.

It is an advantage that isolating power reduction management to a specific UE allows to adjust the power reduction step size in relation to the reported severity factor. High severity factors may lead to larger step sizes, whereas lower severity factors may lead to lower step sizes. Also, an averaging of the severity factors may be used to adjust the agility of the HNB power adjustment.

The benefit of adding a UE-specific relation is that this procedure allows a more customized control of the HNB power reduction by a single UE or UE/macro cell combination. There is a likelihood that these power reduction steps associated with a unique identifier are also satisfying other interfered UEs which are camping on the one or other macro cells. Only those UEs which still receive too much interference can then enter a similar process in a later stage, and can command a further power reduction using their respective unique identifiers.

Generally, it is not essential where the unique identifier is generated or how it is formed. In principle, this may happen in the macro nodeB, but preferably this may be done by a combination (composition) of an identification of the relevant UE reporting the interference and an identification of the macro nodeB, thus allowing a resolution in the case of multiple interference reporting UEs in one macro cell.

Such unique identifiers may for example be derived from IMSI (International Mobile Subscriber Identity) or TMSI (Temporary Mobile Subscriber Identity), be combined with the macro cell physical cell identification. But it can be also any other kind of identifier generated in the UE as long as the identifier is unique, or at least selected randomly from such a big pool, that a collision of identical identifiers is minimal.

Stated in other terms, the HNB sticks to power reduction commands with a certain identifier as long as the selected identifier is (repeatedly) indicated, i.e. further power reduction commands with this identifier are (repeatedly) received, within a certain time period (expectation window). The HNB does not necessarily need to identify the sending MNB or the UE which has sent the interference report from the received identifier. Accordingly, the HNB ignores any power reduction command within the expectation window, which does not indicate the selected identifier. Only after the expectation window has expired without reception of a new power reduction command exhibiting the selected identifier, the HNB will start considering power reduction commands with another identifier.

Although the above example is described with a combination of usage of unique identifiers and severity levels, it is to be noted that severity levels do not necessarily need to be utilized when unique identifiers are used. Thus, in the flowchart of FIG. 4, step S43 may for example be omitted.

In summary, a method according to exemplary embodiments of the present invention is based on the fact that initial and further power reduction commands each include a unique identifier, and comprises the operations of, upon receipt of an initial power reduction command with a first unique identifier, reducing the transmit power in the home network area by the predetermined power reduction amount and starting a timer with a predetermined time period, said timer being associated with said first unique identifier, upon receipt of a further power reduction command with said first unique identifier as long as the timer is not expired, reducing the transmit power in the home network area by the predetermined power reduction amount and restarting the timer associated with said first unique identifier with the predetermined time period, and upon receipt of a further power reduction command with a unique identifier other than said first unique identifier as long as the predetermined time period is not expired, discarding the further power reduction command. Receiving of power reduction commands may be accomplished by a receiver, reducing transmit power may by accomplished by a power reduction unit, starting a timer may be accomplished by a timer unit, and discarding power reduction commands as well as an appropriate control of the power reduction unit and the timer unit may be accomplished by a power reduction command processor.

In brief, an exemplary technique according to embodiments of the present invention is based on the principle that a received power reduction command with a unique identifier is discarded, when (as long as) a timer (i.e. a blocking window) being associated with a different unique identifier is active (i.e. not elapsed) upon receipt thereof, which has been started upon receipt of an initial power reduction command with the different unique identifier.

Figure 5:
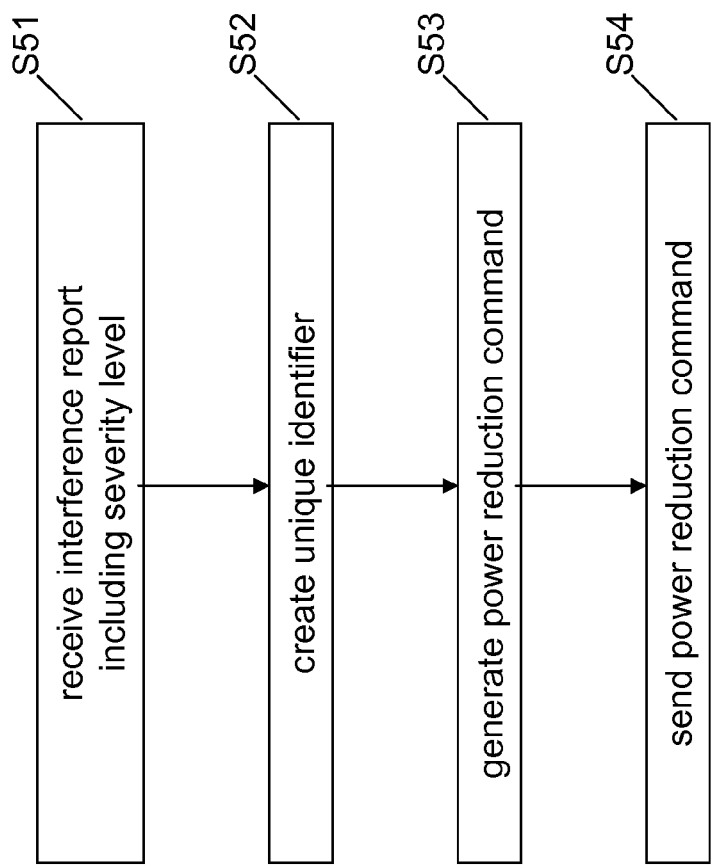
FIG. 5 shows a flowchart of an example of a method at a macro cell according to exemplary embodiments of the present invention.

FIG. 5 shows a flowchart of an example of a method at a macro cell according to exemplary embodiments of the present invention. The thus depicted method may be implemented to be carried out by or at a macro base station or macro nodeB or macro evolved nodeB, commonly denoted as MNB, of a macro cell or macro access network or macro network area.

As depicted in FIG. 5, an exemplary implementation of such a method may comprise the following steps.

In step S51, an interference report is received from a user equipment of the relevant macro cell, which detects an interference caused by a home cell. The interference report includes an indication of a presence of interference and a severity level indicating a degree of the interference in the macro cell caused by the home cell. In step S52, a unique identifier is created for the received interference report. The thus created unique identifier may have any standardized format so as to enable interoperability between network equipment of different vendors/providers. In step S53, a power reduction command concerning the received interference report is generated including the created unique identifier. In step S54, the generated power reduction command is sent to the HNB of the home cell causing the interference reported by the present interference report. When more than one power reduction command is available, the power reduction commands re sent in a predetermined time structure. The unique identifier mentioned here is equivalent to the unique identifier mentioned above in conjunction with FIG. 4.

The receiving may be accomplished by a receiver, the identifier creating may be accomplished by a unique identifier creator, the command generating may be accomplished by a power reduction command generator, and the sending may be accomplished by a transmitter.

In brief, an exemplary technique according to embodiments of the present invention is based on the principle that not only the presence of interference is reported, but also a severity level thereof and/or a unique identifier identifying the reporting source. Such unique identifier may unique identify a user equipment triggering the respective power reduction command or a combination of a user equipment triggering the respective power reduction command and its responsible macro cell network element.

Figure 6:
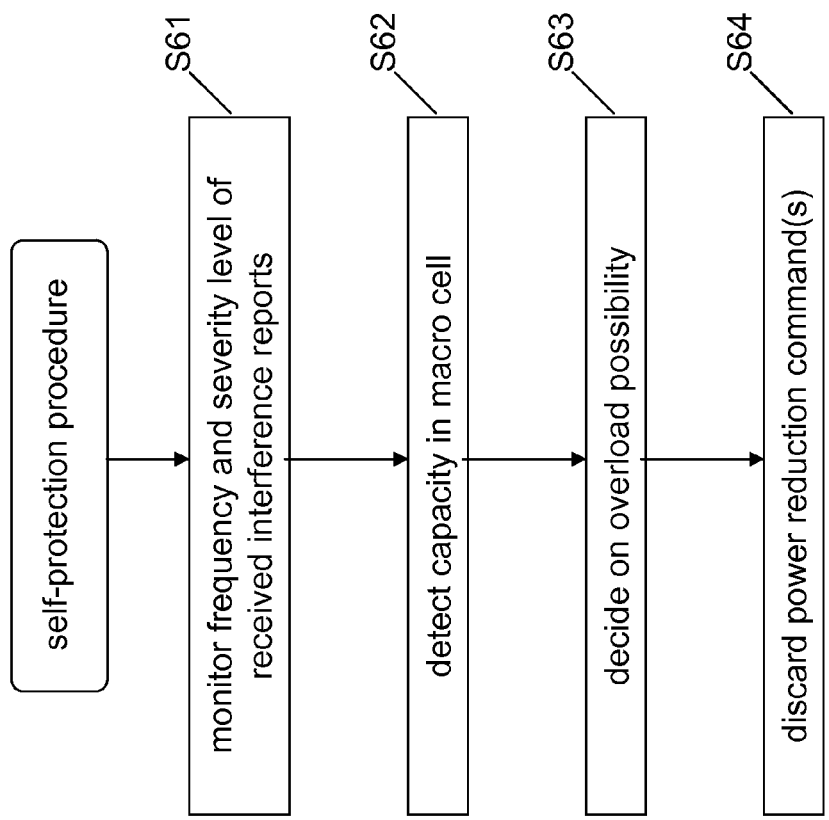
FIG. 6 shows a flowchart of another example of a method at a macro cell according to exemplary embodiments of the present invention.

FIG. 6 shows a flowchart of another example of a method at a macro cell according to exemplary embodiments of the present invention. The thus depicted method may be implemented to be carried out by or at a macro base station or macro nodeB or macro evolved nodeB, commonly denoted as MNB, of a macro cell or macro access network or macro network area. The thus depicted may be regarded as a supplementation of the method according to FIG. 5. It may for example be performed between steps S53 and S54 according to FIG. 5.

According to this method, the involved MNB may perform a self-protection procedure to avoid an overload of the macro cell due to the reduction of a home cell's coverage area in response to respective power reduction commands and a thus triggered handover of UEs (being part of the CSG of the home cell) from the home cell to the macro cell. That is, instead of dealing with interference reports in a transparent manner by essentially only forwarding them (after adding a unique identifier), a MNB may add further intelligence to the overall power management control in a home environment in that a filtering of power reduction commands is introduced.

As depicted in FIG. 6, an exemplary implementation of such a method may comprise the following steps.

In step S61, frequency and severity levels of received interference reports for a specific HNB are monitored. That is, received interference reports are read/analyzed. In step S62, a capacity level in the macro network area is detected. In step S63, a possibility of overload in the macro network area is decided on the basis of the monitored frequency and severity levels and the detected capacity level. In step S64 generated power reduction commands are discarded (i.e. prevented from being sent), if it is decided that there is a possibility of overload in the macro network area. Accordingly, the macro nodeB makes a trade-off between individual limited connections, to avoid a generic overload of the macro cell by handovers from CSG-related mobiles to the macro cell.

Instead of sending power reduction command to the HNB, which may be detrimental to the load situation in the macro cell, the MNB may deal with the reported interference situation in an alternative way under its control, if appropriate. That is, other means of interference handling may be applied. For example, there may be executed a handover of the UE allocated to the macro cell to a different frequency layer or to another radio access technology, as long the allocated service can be maintained thereby. Another measure could be that the MNB may send a message to the HNB to temporarily open the CSG for the UE under interference situation, and the UE may then change its connection to the HNB. It is to be noted that this list of potential alternative measures is only exemplary and does not represent an exhaustive list of alternative interference management solutions in this regard.

The above method may be accomplished by a power reduction command processor. Namely, the monitoring may be accomplished by an interference monitor, the capacity detecting may be accomplished by a capacity detector, and the deciding and discarding may be accomplished by an overload processor.

Thus, the macro nodeB may provide for an optimal service for the UE related to its macro cell. This is achieved by avoiding an excessive shrinkage of home cell coverage, thus preventing handovers from the shrinking home cell to the macro cell, which would increase the load of the macro cell, especially if data rate demanding services had been active.

In brief, an exemplary technique according to embodiments of the present invention is based on the principle that a self-protecting procedure is performed at a network element of a macro cell so as to avoid an overloading of the macro cell in response to power reductions at a network element of the home cell.

Figure 7:
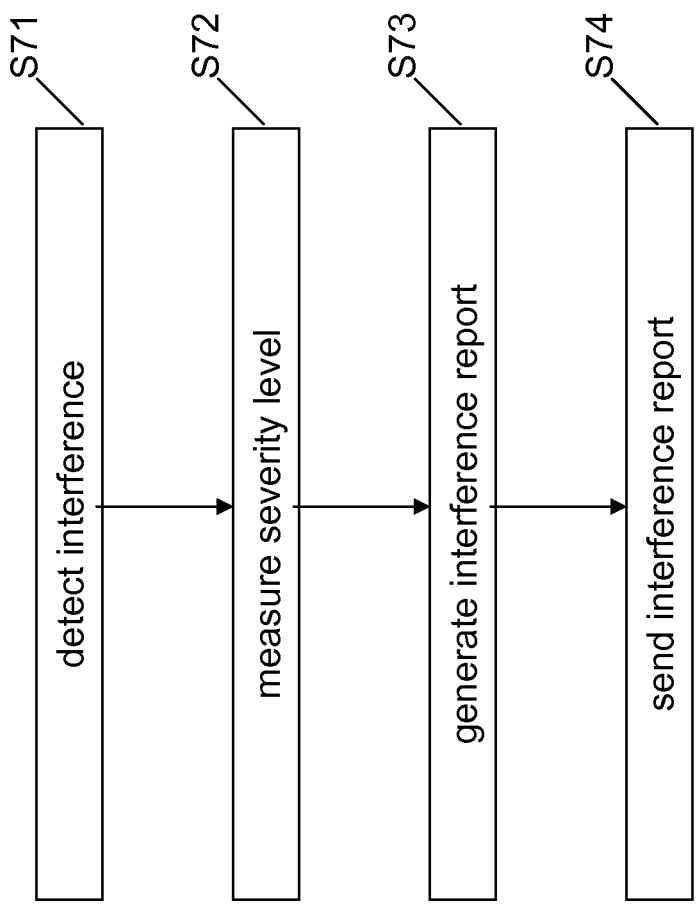
FIG. 7 shows a flowchart of an example of a method at a user equipment according to exemplary embodiments of the present invention.

FIG. 7 shows a flowchart of an example of a method at a user equipment according to exemplary embodiments of the present invention. The thus depicted method may be implemented to be carried out by or at a mobile station or user equipment at/of a macro cell or macro access network or macro network area.

As depicted in FIG. 7, an exemplary implementation of such a method may comprise the following steps.

In step S71, a presence of interference in the macro cell caused by the transmit power in the home cell is detected. In step S72, a severity level indicating a degree of the interference in the macro cell is measured. In step S73, an interference report including an indication of a presence of the interference and the severity level is generated. The generation of the interference report may also comprise adding a unique identification of the user equipment to the interference report. In step S74, the generated interference report is sent to a MNB of the relevant macro cell of the user equipment.

The interference detecting may be accomplished by an interference detector, the severity measuring may be accomplished by a severity level meter, the report generating may be accomplished by an interference report generator, and the sending may be accomplished by a transmitter.

Accordingly, severity information is sent jointly with the power reduction command to the MNB of the macro cell. To achieve this, the communication structure is enhanced so as to deal with a more individually adopted interference management as described herein. Beside the interference report, the UE reports the estimated quality degradation as a level of severity. The quality reduction estimation may be a mobile station implementation specific solution, but is formatted in a standardized way to allow a harmonized interpretation by HNBs from various vendors. As an example, the UE may use the measured interference, which is assumed to be caused by a dominant interferer (the HNB), in relation to its noise floor, and may estimate the noise rise dependent quality loss.

In brief, an exemplary technique according to embodiments of the present invention is based on the principle that a user equipment or the like does not only detect the presence of interference, but also a severity level thereof, and reports both information (together with an identification thereof) to a network element of its responsible macro cell.

While in the foregoing exemplary embodiments of the present invention are described mainly with reference to methods, procedures and functions, corresponding exemplary embodiments of the present invention also cover respective apparatuses, network nodes and systems, including both software and/or hardware thereof.

Respective exemplary embodiments of the present invention are described below referring to FIGS. 8 to 10, while for the sake of brevity reference is made to the detailed description of respective corresponding methods and operations according to FIGS. 3 to 7, respectively.

Figure 8:
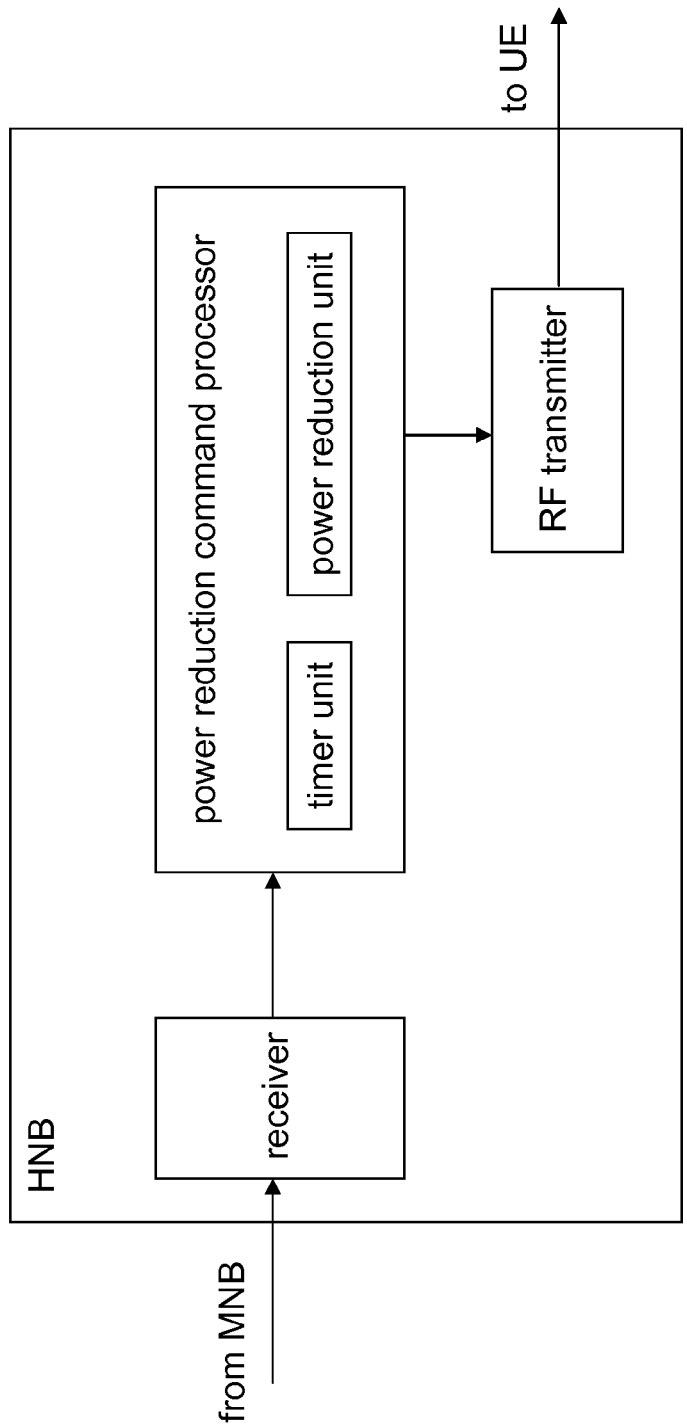
FIG. 8 shows a schematic block diagram of an apparatus at a home cell according to exemplary embodiments of the present invention.
Figure 9:
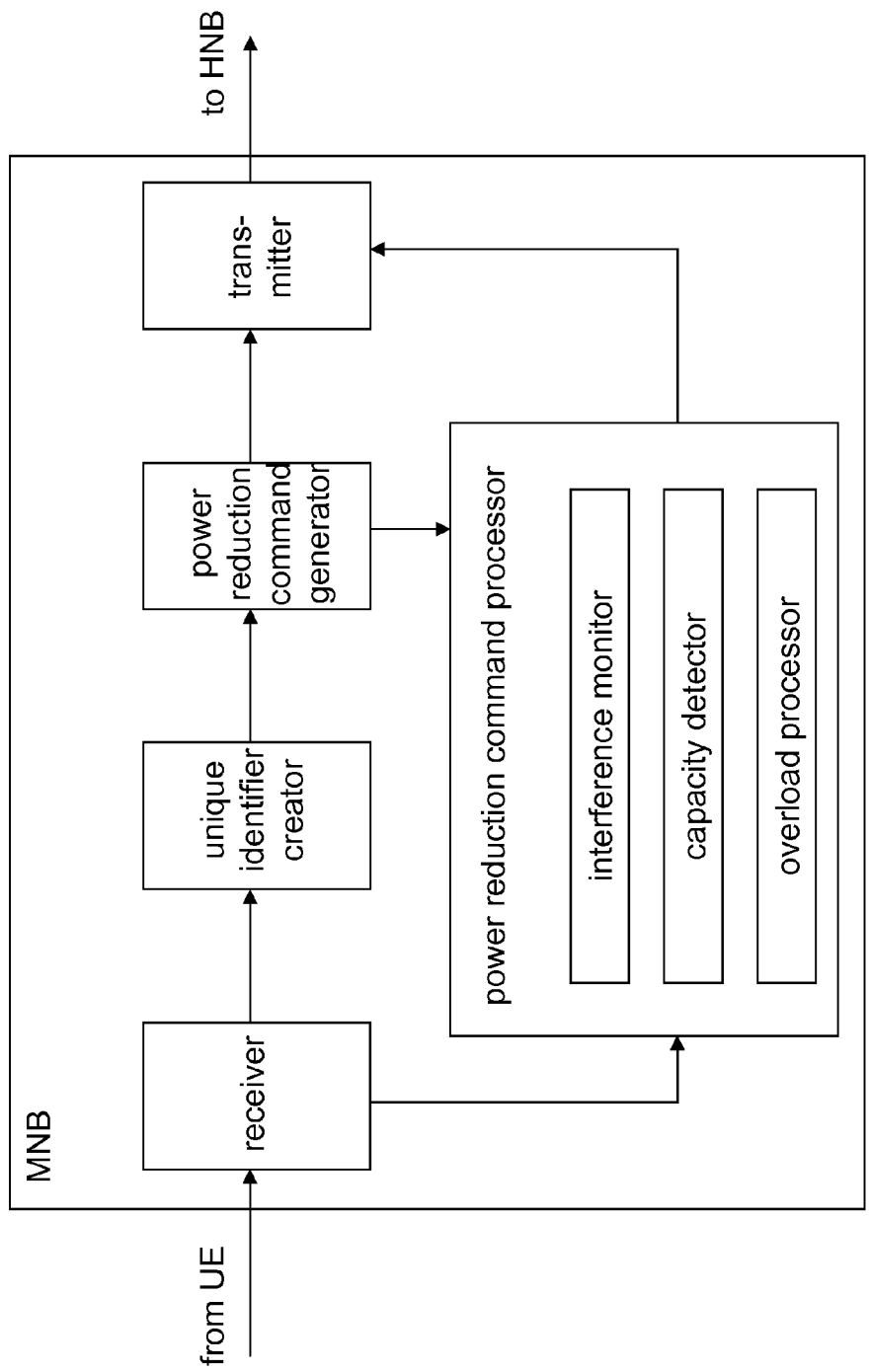
FIG. 9 shows a schematic block diagram of an apparatus at a macro cell according to exemplary embodiments of the present invention.
Figure 10:
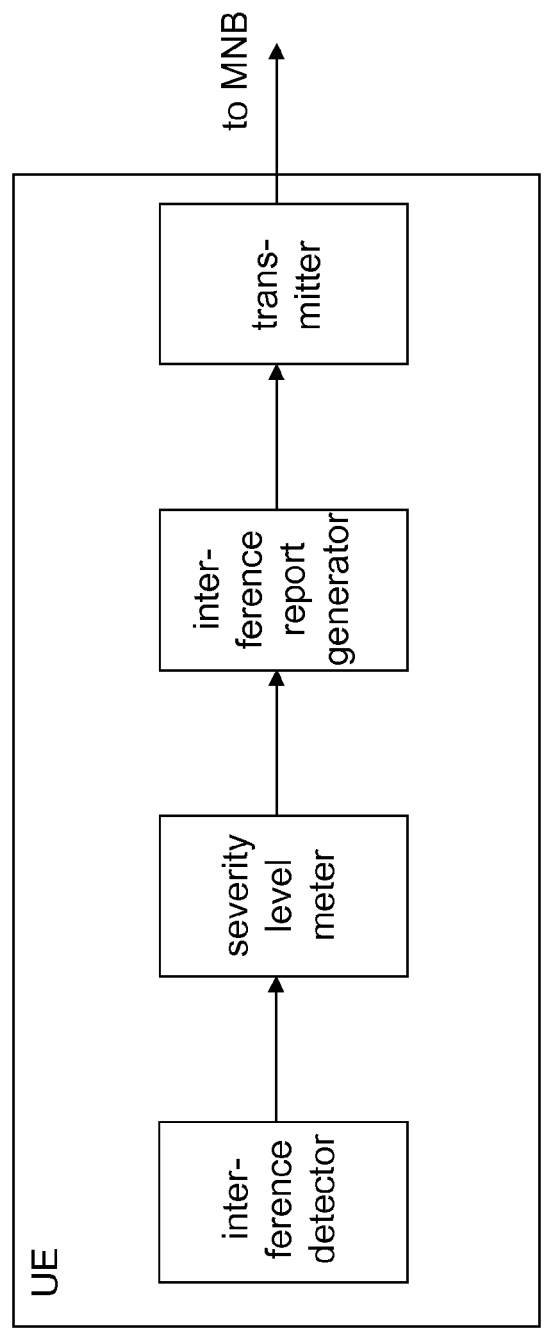
FIG. 10 shows a schematic block diagram of an apparatus at a user equipment according to exemplary embodiments of the present invention.

In FIGS. 8 to 10 below, the solid line blocks are basically configured to perform respective operations as described above. The entirety of solid line blocks are basically configured to perform the methods and operations as described above, respectively. With respect to FIGS. 8 to 10, it is to be noted that the individual blocks are meant to illustrate respective functional blocks implementing a respective function, process or procedure, respectively. Such functional blocks are implementation-independent, i.e. may be implemented by means of any kind of hardware or software, respectively. The arrows interconnecting individual blocks are meant to illustrate an operational coupling there-between, which on the one hand is implementation-independent (e.g. wired or wireless) and on the other hand may also comprise an arbitrary number of intermediary functional entities not shown. The direction of arrow is meant to illustrate the direction in which certain operations are performed and/or the direction in which certain data is transferred.

Further, in FIGS. 8 to 10, only those functional blocks are illustrated, which relate to any one of the above-described methods, procedures and functions. A skilled person will acknowledge the presence of any other conventional functional blocks required for an operation of respective structural arrangements, such as e.g. a power supply, a central processing unit, respective memories or the like.

Further, the following is to be noted regarding the term "receiver" as used subsequently, while similar notions may also apply to the term "transmitter" as used subsequently. Basically, it is to be noted that a receiver as depicted and/or described herein is not meant to be a radio frequency (RF) receiver which is usually provided in a base station or (e) nodeB or the like. Namely, while a base station or (e) nodeB or the like usually comprises at least one, normally two RF receivers (one RF receiver for initialization and for monitoring of the downlink spectrum, one RF receiver for operation and receiving the uplink RF signals), these conventional RF receivers are not depicted and/or described herein for the sake of clarity, or are specifically denoted as relating to RF operations. Rather, the receivers as depicted/described herein are those specifically configured for the purposes according to embodiments of the present invention. That is, as the signals exchanged according to embodiments of the present invention (e.g. power reduction commands, interference reports, etc.) are regarded to be in the form of a kind of protocol, the receivers as depicted/described herein may be regarded as protocol discriminators configured to extract the relevant information element(s) from the signals exchanged.

FIG. 8 shows a schematic block diagram of an apparatus at a home cell according to exemplary embodiments of the present invention. The thus depicted apparatus may be implemented by or at a home base station or home nodeB or home evolved nodeB, commonly denoted as HNB, of a home cell or home access network or home network area.

According to FIG. 8, the apparatus according to exemplary embodiments of the present invention may have interfaces to a macro cell, i.e. MNB, and a user equipment of the macro cell and/or the home cell.

According to an exemplary embodiment depicted in FIG. 8, the thus depicted apparatus is configured to perform any method as described in conjunction with FIGS. 3 and 4. Therefore, while basic operations are described hereinafter, reference is made to the above description for details.

According to an exemplary embodiment depicted in FIG. 8, the thus depicted apparatus comprises a receiver, a power reduction command processor, and a radio frequency (RF) transmitter for transmitting downlink (RF) signals with the transmit power of the HNB towards respective user equipments in its coverage area.

The receiver may be configured to receive power reduction commands from a network element of a macro cell, such as a MNB. The receiver thus represents means for receiving. The power reduction command processor may be configured to process received power reduction commands. The power reduction command processor thus represents means for processing.

According to the exemplary embodiment depicted in FIG. 8, the power reduction command processor comprises a timer unit and a power reduction unit. The power reduction command processor thus represents means for controlling the timer unit and the power reduction unit. The timer unit may be configured to start a timer with a predetermined time period under control by the power reduction command processor, and it thus represents means for controlling a timer. The power reduction unit may be configured to reduce the transmit power of the HNB under control by the power reduction command processor, and it thus represents means for performing power reduction.

In one example implementation, the power reduction command processor may be configured to, upon receipt of an initial power reduction command, cause the power reduction unit to reduce a transmit power in a home cell by a predetermined power reduction amount and cause the timer unit to start a timer with a predetermined time period. Also, the power reduction command processor may be configured to, upon receipt of a further power reduction command as long as the timer is not expired, discard the further power reduction command. Also, the power reduction command processor may be configured to, upon receipt of a further power reduction command after the timer is expired, cause the power reduction unit to reduce a transmit power in the home cell by the predetermined power reduction amount and cause the timer unit to restart the timer with the predetermined time period.

In another example implementation, initial and further power reduction commands each include a unique identifier, and the power reduction command processor may be configured to, upon receipt of an initial power reduction command with a first unique identifier, cause the power reduction unit to reduce the transmit power in the home cell by the predetermined power reduction amount and cause the timer unit to start a timer with a predetermined time period, said timer being associated with said first unique identifier. Also, the power reduction command processor may be configured to, upon receipt of a further power reduction command with said first unique identifier as long as the timer is not expired, cause the power reduction unit to reduce the transmit power in the home cell by the predetermined power reduction amount and cause the time unit to restart the timer associated with said first unique identifier with the predetermined time period. Also, the power reduction command processor may be configured to, upon receipt of a further power reduction command with a unique identifier other than said first unique identifier as long as the predetermined time period is not expired, discard the further power reduction command. Also, the power reduction command processor may be configured to, upon non-receipt of a further power reduction command within the predetermined time period, disable the timer associated with said first unique identifier. Also, the power reduction command processor may be configured to, upon receipt of a further power reduction command with a unique identifier other than said first unique identifier after the timer associated with said first unique identifier is expired, cause the power reduction unit to reduce the transmit power in the home cell by the predetermined power reduction amount and cause the timer unit to start a timer with the predetermined time period, said timer being associated with said other unique identifier.

The power reduction unit may be configured to determine a power reduction amount being associated with a unique identifier on the basis of the severity level in a power reduction command including said unique identifier, and set the determined power reduction amount as the predetermined power reduction amount. The power reduction unit thus represents means for determining and setting.

FIG. 9 shows a schematic block diagram of an apparatus at a macro cell according to exemplary embodiments of the present invention. The thus depicted apparatus may be implemented by or at a macro base station or macro nodeB or macro evolved nodeB, commonly denoted as HNB, of a macro cell or macro access network or macro network area.

According to FIG. 9, the apparatus according to exemplary embodiments of the present invention may have interfaces to a user equipment of the macro cell and a home cell, i.e. a HNB.

According to an exemplary embodiment depicted in FIG. 9, the thus depicted apparatus may be configured to perform any method as described in conjunction with FIGS. 5 and 6. Therefore, while basic operations are described hereinafter, reference is made to the above description for details.

According to an exemplary embodiment depicted in FIG. 9, the thus depicted apparatus comprises a receiver, an identifier creator, a power reduction command generator and a transmitter.

The receiver may be configured to receive an interference report including an indication of a presence of interference and a severity level indicating a degree of the interference in a macro cell caused by a transmit power in a home cell from a user equipment of said macro network area. The receiver thus represents means for receiving. The identifier creator may be configured to create a unique identifier for the received interference report. The identifier creator thus represents means for creating. The power reduction command generator may be configured to generate a power reduction command concerning the received interference report including the created unique identifier. The power reduction command generator thus represents means for generating. The transmitter may be configured to send the generated power reduction command to a network element of the home network area, and/or to send a plurality of power reduction commands in a predetermined time structure. The transmitter thus represents means for sending.

In one example implementation, the apparatus according to FIG. 9 also comprises a power reduction command processor being configured to process generated power reduction command e.g. in terms of their sending. It thus represents means for processing. According to FIG. 9, the power reduction command generator comprises an interference monitor, a capacity detector and an overload processor. It thus also comprises means for controlling the interference monitor, the capacity detector and the overload processor. The interference monitor may be configured to monitor frequency and severity levels of received interference reports, and may thus represent means for monitoring. The capacity detector may be configured to detect a capacity level in the macro cell, and may thus represent means for detecting. The overload processor may be configured to decide on a possibility of overload in the macro cell on the basis of the monitored frequency and severity levels and the detected capacity level, and to discard generated power reduction commands, if it is decided that there is a possibility of overload in the macro network area. It may thus represent means for deciding and discarding.

FIG. 10 shows a schematic block diagram of an apparatus at a user equipment according to exemplary embodiments of the present invention. The thus depicted apparatus may be implemented by or at a mobile station or user equipment at/of a macro cell or macro access network or macro network area.

According to FIG. 10, the apparatus according to exemplary embodiments of the present invention may have an interface to a macro cell, i.e. MNB.

According to an exemplary embodiment depicted in FIG. 10, the thus depicted apparatus is configured to perform any method as described in conjunction with FIG. 7. Therefore, while basic operations are described hereinafter, reference is made to the above description for details.

According to an exemplary embodiment depicted in FIG. 10, the thus depicted apparatus comprises an interference detector, a severity level meter, an interference report generator and a transmitter.

The interference detector may be configured to detect a presence of interference in the macro cell caused by the transmit power in the home cell, and may thus represent means for detecting. The severity level meter may be configured to measure a severity level indicating a degree of the interference in the macro network area, and may thus represent means for measuring. The interference report generator may be configured to generate an interference report including an indication of a presence of the interference and the severity level, and may thus represent means for generating. The transmitter may be configured to send the generated interference report to a network element of the macro network area, and may thus represent means for sending.

The interference report generator may be configured to add a unique identification to the interference report, and may thus represent means for adding.

In general, it is to be noted that respective functional blocks or elements according to above-described aspects can be implemented by any known means, either in hardware and/or software, respectively, if it is only adapted to perform the described functions of the respective parts. The mentioned method steps can be realized in individual functional blocks or by individual devices, or one or more of the method steps can be realized in a single functional block or by a single device.

Generally, any method step is suitable to be implemented as software or by hardware without changing the idea of the present invention. Devices and means can be implemented as individual devices, but this does not exclude that they are implemented in a distributed fashion throughout the system, as long as the functionality of the device is preserved. Such and similar principles are to be considered as known to a skilled person.

Software in the sense of the present description comprises software code as such comprising code means or portions or a computer program or a computer program product for performing the respective functions, as well as software (or a computer program or a computer program product) embodied on a tangible medium such as a computer-readable storage medium having stored thereon a respective data structure or code means/portions or embodied in a signal or in a chip, potentially during processing thereof.

Generally, for the purpose of the present invention as described herein above, it should be noted that method steps and functions likely to be implemented as software code portions and being run using a processor at one of the entities, a network element, or a terminal (as examples of devices, apparatuses and/or modules thereof, or as examples of entities including apparatuses and/or modules), are software code independent and can be specified using any known or future developed programming language, such as e.g. Java, C++, C, and Assembler, as long as the functionality defined by the method steps is preserved;

generally, any method step is suitable to be implemented as software or by hardware without changing the idea of the invention in terms of the functionality implemented;

method steps, functions, and/or devices, apparatuses, units or means likely to be implemented as hardware components at a terminal or network element, or any module(s) thereof, are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components; in addition, any method steps and/or devices, units or means likely to be implemented as software components may for example be based on any security architecture capable e.g. of authentication, authorization, keying and/or traffic protection;

devices, apparatuses, units or means can be implemented as individual devices, apparatuses, units or means, but this does not exclude that they are implemented in a distributed fashion throughout the system, as long as the functionality of the device, apparatus, unit or means is preserved, an apparatus may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;

a device may be regarded as an apparatus or as an assembly of more than one apparatus, whether functionally in cooperation with each other or functionally independently of each other but in a same device housing, for example.

The present invention also covers any conceivable combination of method steps and operations described above, and any conceivable combination of nodes, apparatuses, modules or elements described above, as long as the above-described concepts of methodology and structural arrangement are applicable.

In the above, there are disclosed techniques being capable of omitting that multiple uncoordinated power reduction messages lead to a fast and unwanted extinction of a (home) cell. Further, it is disclosed that a severity level may be introduced, which allows to adjust the HNB algorithm for the power reduction in terms of power reduction amount, to be more or less aggressive. Further, it is disclosed that a MNB may treat power reduction messages in a transparent way or may add further intelligence to the algorithm, to prevent macro cell overload by extinguishing CSG (home) cells.

There are provided measures for power reduction control in a home network environment, which may be applicable in an interworking of a home network area and a macro network area. Such measures for power reduction control may for example comprise, upon receipt of an initial power reduction command from a network element of a macro network area, reducing a transmit power in a home network area by a predetermined power reduction amount and starting a timer with a predetermined time period, and upon receipt of a further power reduction command from a network element of a macro network area as long as the timer is not expired, discarding the further power reduction command.

Even though the invention is described above with reference to the examples according to the accompanying drawings, it is to be understood that the invention is not restricted thereto. Rather, it is apparent to a skilled person that the present invention can be modified in many ways without departing from the scope of the inventive idea as disclosed herein.

The invention claimed is:

1. A method comprising
receiving, from a user equipment of a macro cell, an interference report including an indication of a presence of interference and a severity level indicating a degree of the interference in the macro cell caused by a transmit power in a home network area,
creating a unique identifier for the received interference report,
generating a power reduction command concerning the received interference report including the created unique identifier, and
sending the generated power reduction command to a network element of the home network area;
wherein the unique identifier uniquely identifies at least one of the user equipment and a combination of the user equipment and the macro cell.

2. The method according to claim 1, wherein the sending comprises, when more than one power reduction command is available, sending the power reduction commands in a predetermined time structure.

3. The method according to claim 1,
wherein the unique identifier uniquely identifies at least one of the user equipment of the macro cell and a combination of the user equipment and a base station or nodeB of the macro cell, and
wherein said creating comprises composing the unique identifier of at least one of a unique identification of the user equipment and a unique identification of a base station or nodeB of the macro cell.

4. The method according to claim 1, further comprising
monitoring frequency and severity levels of received interference reports,
detecting a capacity level in the macro cell,
deciding on a possibility of overload in the macro cell on the basis of the monitored frequency and severity levels and the detected capacity level, and
discarding generated power reduction commands, if it is decided that there is a possibility of overload in the macro cell.

5. A non-transitory computer-readable storage medium comprising program code, the program code run on a processor, to perform the method according to claim 1.

6. An apparatus comprising
at least one processor; and
at least one memory including computer program code, where the at least one memory and the computer program code are configured, with the at least one processor, to cause the apparatus to at least:
receive from a user equipment of a macro cell an interference report including an indication of a presence of interference and a severity level indicating a degree of the interference in the macro cell caused by a transmit power in a home network area,
create a unique identifier for the received interference report,
generate a power reduction command concerning the received interference report including the created unique identifier, and
send the generated power reduction command to a network element of the home network area;
wherein the unique identifier uniquely identifies at least one of the user equipment and a combination of the user equipment and the macro cell.

7. The apparatus according to claim 6, wherein, the at least one memory including the computer program code is configured with the at least one processor to cause the apparatus, when more than one power reduction command is available, to send the power reduction commands in a predetermined time structure.

8. The apparatus according to claim 6,
wherein the unique identifier uniquely identifies at least one of the user equipment and a combination of the user equipment and a base station or nodeB of the macro cell, and
wherein said identifier creator is configured to compose the unique identifier of at least one of a unique identification of the user equipment and a unique identification of a base station or nodeB of the macro cell.

9. The apparatus according to claim 6, the at least one memory including the computer program code is configured with the at least one processor to cause the apparatus to:
monitor frequency and severity levels of received interference reports,
detect a capacity level in the macro cell, and
decide on a possibility of overload in the macro cell on the basis of the monitored frequency and severity levels and the detected capacity level, and to discard generated power reduction commands, if it is decided that there is a possibility of overload in the macro cell.

10. A method comprising
detecting by a user equipment of a macro cell a presence of interference in the macro cell caused by the transmit power in a home network area,
measuring a severity level indicating a degree of the interference in the macro cell,
generating an interference report including an indication of a presence of the interference and the severity level,
sending the generated interference report to a network element of the macro cell, and
adding a unique identification to the interference report;
wherein the unique identification uniquely identifies at least one of the user equipment and a combination of the user equipment and the macro cell.

11. The method according to claim 10,
wherein the network element of the macro cell comprises at least one of a macro base station and a macro nodeB of said macro network area, and
wherein the home network area comprises a femtocell of a wireless communication network.

12. A user equipment comprising
an interference detector configured to detect a presence of interference in a macro cell caused by the transmit power in a home network area,
a severity level meter configured to measure a severity level indicating a degree of the interference in the macro cell,
an interference report generator configured to generate an interference report including an indication of a presence of the interference and the severity level,
a transmitter configured to send the generated interference report to a network element of the macro cell, when the user equipment is a user equipment of the macro cell;
wherein said interference report generator is configured to add a unique identification to the interference report, and
wherein the unique identification uniquely identifies at least one of the user equipment and a combination of the user equipment and the macro cell.

13. A method comprising:
receiving by a network element of a home network area from a network element of a macro cell a power reduction command including a unique identifier;
wherein the unique identifier uniquely identifies at least one of a user equipment of the macro cell and a combination of the user of the equipment of the macro cell and the macro cell.

14. A non-transitory computer-readable storage medium comprising program code, the program code run on a processor, to perform the method according to claim 10 or 13.

* * * * *